(12) United States Patent
Shimamoto

(10) Patent No.: US 6,197,224 B1
(45) Date of Patent: Mar. 6, 2001

(54) SELECTIVELY REFLECTIVE SHAPED ARTICLES

(75) Inventor: Shu Shimamoto, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/440,623

(22) Filed: Nov. 16, 1999

(30) Foreign Application Priority Data

Nov. 17, 1998 (JP) .................................................. 10-326757

(51) Int. Cl.$^7$ ............................... F21V 9/14; C09K 19/54
(52) U.S. Cl. ....................................... 252/585; 252/299.01
(58) Field of Search ............................... 252/585, 299.01

(56) References Cited

U.S. PATENT DOCUMENTS

| | | | |
|---|---|---|---|
| 4,933,110 | * | 6/1990 | Tucker ................................. 252/582 |
| 4,936,995 | * | 6/1990 | Kwiatkowski ........................ 252/586 |
| 4,968,454 | * | 11/1990 | Crano et al. ......................... 252/586 |
| 5,021,196 | * | 6/1991 | Crano et al. ......................... 252/586 |
| 5,354,513 | * | 10/1994 | Nakamura et al. .................. 252/585 |
| 5,626,796 | * | 5/1997 | Tsujimura et al. ................... 252/582 |
| 5,911,911 | * | 6/1999 | Keller et al. ..................... 252/299.01 |
| 5,914,073 | * | 6/1999 | Kobayashi et al. .................. 252/585 |
| 5,922,246 | * | 7/1999 | Matsushita et al. ................. 252/582 |
| 6,007,738 | * | 12/1999 | Shimamoto et al. ............ 252/299.01 |

FOREIGN PATENT DOCUMENTS

| | | |
|---|---|---|
| 0799877A1 | 10/1997 | (EP) . |
| 10-025365 | 1/1998 | (JP) . |

OTHER PUBLICATIONS

Nishio Y. et al: "Morphological Studies of Liquid–Crystalline Cellulose Derivatives. I. Liquid–Crystalline Characteristics of Hydroxypropyl Cellulose In2–Hydroxyethyl Methacrylate Solutions and in Polymer Composites Prepared by Bulk Polymerization", Journal of Polymer Science, Polymer Physics Edition, US, John Wiley & Sons. New York, vol. 23, No. 5, May 1, 1985, pp. 1043–1052 XP002034860 ISSN: 0887–6266, the whole document.

Jiang S. H. et al: "Orientation of Polymer Chains in Oriented (E–CE) C/AA Liquid Crystalline Solutions", Journal of Macromolecular Science Part B, Physics, US, Marcel Dekker Inc., New York, NY, vol. 34, No. 4, Jan. 1, 1995, pp. 357–367, XP002034859, ISSN: 0022–2348, the whole document.

D. G. Gray, "Chiral Nematic Ordering of Polysaccharides," Carbohydrate Polymers, 25, pp. 277–284 (1994).

Stephen D. Jacobs, "Liquid Crystal Devices for Laser Systems," Journal of Fusion Energy, vol. 5, No. 1, pp. 65–75, (1986).

S. H. Jiang et al., "Characterization and Radical Polymerization of (E–CE) C/AA Mesomorphic Solutions," Journal of Applied Polymer Science, vol. 49, pp. 125–132, (1993).

Yoshiyuki Nishio et al., "Structural Investigations of Liquid–Crystalline Ethylcellulose," Polymer Journal, vol. 17, No. 6, pp. 753–760 (1985).

* cited by examiner

Primary Examiner—C. H. Kelly

(57) ABSTRACT

A shaped article is obtained by polymerizing a selectively reflective solution comprising a cellulose derivative and a polymerizable solvent. The cellulose derivative is a cellulose derivative having an alkyl degree of substitution of about 2.2-3, an acyl degree of substitution of about 0–0.8 (preferably 0.1–0.8), and a total degree of alkyl and acyl substitution of about 2.8–3. The cellulose derivative is thus, e.g., a highly substituted alkyl cellulose (ethyl cellylose) or an acylated alkyl cellulose. Moreover, the polymerizable solvent may be a (meth)acrylic monomer (e.g., (meth) acrylic acid). According to the present invention, a shaped article having selective reflectivity with respect to wavelength and circularly polarized light is provided.

17 Claims, No Drawings

SELECTIVELY REFLECTIVE SHAPED ARTICLES

FIELD OF THE INVENTION

The present invention relates to a shaped article having selective reflectivity with respect to wavelength and circularly polarized light and being useful for the optical system of a circularly polarized light-generator or as a decorative materials.

BACKGROUND OF THE INVENTION

It has been known that cellulose derivatives inclusive of hydroxypropyl cellulose (HPC) and cellulose triphenylcarbamate form chiral nematic (cholesteric) liquid crystalline phases by being dissolved in a suitable solvent under appropriate conditions, e.g., at an appropriate temperature or concentration. The structure of a chiral nematic liquid crystal is described in detail in, for example, Gray, Carbohydrate Polymers, 25, 277–284 (1994). The chiral nematic liquid crystal has a structure where sheet-like nematic liquid crystalline phases are helicoidally piled with the orientations thereof rotated from layer to layer. The chiral nematic liquid crystalline layers has a peculiar optical property that, defining a wavelength corresponding to the product of the pitch and the average refractive index as the maximum, the pitch being the distance taken by the orientation of the sheet-like nematic liquid crystal to rotate through 360 degrees, it selectively reflects circularly polarized light corresponding to the handedness of the sheet-like nematic liquid crystal. It is reported in detail, for example, that such selective reflectivity of the chiral nematic liquid crystal is useful for laser systems as a part of a circularly polarized light generator [see, for instance, Jacobs, Journal of Fusion Energy, 5(1), 65–75 (1986)]. When the wavelength of light selectively reflected by a chiral nematic liquid crystal lies within the visible region, the chiral nematic liquid crystal presents a beautiful color, thus its application to, e.g., decoration materials is also desired.

Generally, since the formation of a chiral nematic liquid crystal is sensitive to conditions such as temperature and concentration and a chiral nematic liquid crystal phase in a liquid state has to be enclosed or sealed in a gap between the glass plates, its use or applications have been limited and its industrial use is rare.

To solve the above-mentioned problems, there have been made attempts to solidify a polymer solution containing a chiral nematic liquid crystal phase for fixing its liquid crystalline structure. For example, in the Journal of Applied Polymer Science,49, 125(1993), there is disclosed a technique comprising the steps of dissolving an ethyl-cyanoethyl cellulose in acrylic acid to form a chiral nematic liquid crystal and then photopolyimerizing the acryic acid contained in the liquid crystal solution to fix its liquid crystalline structure. The technique disclosed by this report is a pioneer one among the techniques for fixing a liquid crystalline structure. However, considering that the synthesis of ethyl-cyanoethyl cellulose requires the use of an acrylonitrile which is thought of as a potential carcinogen, industrially producing ethyl-cyanoethyl cellulose is practically difficult. The literature says that a fixed chiral nematic liquid crystal presents a color due to its selective reflectivity, but no data on its optical properties are disclosed.

In the Polymer Journal, 17,753 (1985), there is disclosed a technique in which a commercially available ethyl cellulose with a degree of substitution of about 2.5 is dissolved in acrylic acid to form a chiral nematic liquid crystal and the liquid crystal solution is then thermally polymerized. This literature, however, does not provide a solid shaped article having selective reflectivity. Moreover, even if a solid shaped article having selective reflectivity is obtained from a chiral nematic liquid crystal solution comprising an ethyl celluose and acrylic acid by adopting the photopolymerization technology disclosed by the aforementioned literature [Journal of Applied Polymer Science, 49, 125 (1993)], the liquid crystallinity of the article is still insufficient and consequently birefringence and selective reflectivity are poor.

In Japanese Patent Application Laid-Open No. 25365/1998, there is disclosed a technique for fixing a liquid crystalline structure by dissolving a cellulose phenylurethane in a polymerizable solvent to form a chiral nematic liquid crystal and polymerizing the polymerizable solvent contained in the liquid crystalline solution. The technique disclosed by this literature is effective in obtaining a polymeric shaped article in a solid state without losing the optical properties of the chiral nematic liquid crystal. In many cases, however, this technique requires the introduction of a phenylcarbamate group into the cellulose and, in many cases, the introduction of a halogen atom such as chlorine or fluorine into a phenyl group for adjusting the selective reflection wavelength to the desired value. Accordingly, there arise problems of harmful effects on the environment that might be caused by the substances by-produced or wasted in the production of cellulose urethanes. Moreover, a cellulose phenylurethane is generally prepared by reacting a cellulose with a phenylisocyanate. However, the synthesis of a phenylisocyanate usually involves the use of phosgene of strong toxicity and therefore unfavorable in view of environmental protection. For such reasons, industrial production of cellulose urethanes are scarcely conducted. Even if brought to industrial production, the cost is high.

In the above-mentioned patent specification, cellulose ethers and cellulose esters are also listed as cellulose derivatives. However, a mixture of a cellulose acetate with a polymerizable monomer does not show liquid crystallinity. As can be understood from the above, a theory which is substantially valid and effective in determining conditions and solvents appropriate for forming a liquid crystalline phase, including the species of substituents or degree of substitution of cellulose derivatives, has not been found yet. To selectively reflect light of the desired wavelength, the pitch of the liquid crystalline phase should be controlled within the range of about 150 to 2,000 nm, and a theory substantially valid and effective for the control of the selective reflection wavelength and the pitch has also not been established yet.

SUMMARY OF THE INVENTION

Accordingly, an object of the present invention is to provide a selectively reflective composition which selectively reflects circularly polarized light, a shaped article thereof, and a process for producing the same.

Another object of the present invention is to provide a shaped article such as a film which is relatively inexpensive and of high selective reflectivity, and a process for producing the same.

Still another object of the present invention is to provide a shaped article having selective reflectivity with its liquid crystalline structure and optical properties maintained, and a process for producing the same.

The inventors of the present invention made intensive and extensive studies to achieve the above objects, and finally found that a solution comprising a cellulose derivative (e.g., an ethyl cellulose with high ethyl degree of substitution or a highly modified ethyl cellulose) in combination with a polymerizable solvent [e.g.,(meth)acrylic acid] has markedly improved liquid crystallinity and forms a chiral nematic liquid crystal having high selective reflectivity (selectively reflective liquid crystalline composition), and that a solidified product of excellent selective reflectivity is easily formed by polymerizing (photopolymerization) the liquid crystal system without destroying its liquid crystalline structure. The liquid crystalline structure and optical properties have been kept even after the polymerization. The present invention is based on the above findings.

The selectively reflective shaped article of the present invention is formed out of a composition comprising a cellulose derivative having an alkyl degree of substitution (e.g., ethyl degree of substitution) of about 2.2 to 3, an acyl degree of substitution (e.g., $C_{2-4}$ acyl degree of substitution) of 0 to 0.8, and a total degree of alkyl and acyl substitution of about 2.8 to 3; and a polymerizable solvent, and preferentially (selectively) reflects right-circularly polarized light. An ethyl degree of substitution (ethyl substitution degree) of about 2.8 to 3 may be sufficient. The polymerizable solvent may be (meth)acrylic acid or an ester thereof. The cellulose derivative forms a chiral nematic liquid crystal structure. The proportion of the cellulose derivative is about 0.7 to 1.5 g relative to 1 g of the polymer of the polymerizable solvent. The birefringence of the shaped article comprising 1 g of the cellulose derivative relative to 1 g of the polymer of the polymerizable solvent is 0.004 to 0.006. The shaped article is in the form of a film or sheet. The present invention includes a selectively reflective composition (a liquid crystal solution) and a process for producing a selectively reflective shaped article.

Incidentally, in the specification, the degree of substitution means "average degree of substitutions".

DETAILED DESCRIPTION OF THE INVENTION

The selectively reflective composition of the present invention comprises a cellulose derivative (alkyl cellulose or alkyl acyl cellulose) and a polymerizable solvent.

[Cellulose derivatives]

In the cellulose derivative, the alkyl degree of substitution thereof is about 2.2 to 3 (e.g., 2.5 to 3, preferably 2.8 to 3, and more preferably 2.9 to 3), and the acyl degree of substitution (degree of acyl substitution) thereof is about 0 to 0.8 (e.g., 0 to 0.5, preferably 0 to 0.2). The total degree of alkyl and acyl substitution is about 2.8 to 3 (e.g., 2.9 to 3). In other words, the cellulose derivative used in the present invention includes an alkyl cellulose and an alkyl acyl cellulose. These cellulose derivative can be used either singly or as a combination of two or more species.

Alkyl groups include $C_{1-6}$ alkyl groups such as methyl, ethyl, propyl, and butyl (particularly ethyl group). As an acyl group, there may be exemplified $C_{2-5}$ acyl groups (particularly, $C_{2-4}$ acyl groups) such as acetyl, propionyl, and butyryl, and (meth)acryloyl group (particularly, acethyl). When the number of carbons the acyl group has exceeds 5, the pitch of a chiral nematic is too lengthened, hindering the selective reflection in the ultraviolet ray region, visible light region, and the near infrared ray region.

Examples of the preferred cellulose derivative are ethyl celluloses having an ethyl degree of substitution of about 2.8 to 3 (e.g., 2.9 to 3) and acetyl ethyl celluloses with an ethyl degree of substitution of 2.5 to 2.9 and an acethyl degree of substitution of 0.1 to 0.5.

Hereinafter, unless stated otherwise, alkyl celluloses and alkyl acyl celluloses are typified by and referred to simply as ethyl cellulose and ethyl acyl cellulose as the preferred cellulose derivatives.

As for the ethyl cellulose, in the case where an ethyl cellulose having an ethyl degree of substitution of about 2.5 is employed, a liquid crystal obtained by dissolving the ethyl cellulose in a polymerizable solvent such as acrylic acid is a left-handed chiral nematic liquid crystal which reflects left-circularly polarized light. However, because its liquid crystallinity is not sufficient, the birefringence thereof is poor and selective reflectivity is low.

In the case of an ethyl cellulose with an ethyl degree of substitution of 2.8 to 3 (particularly, 2.9 to 3), a liquid crystal obtained by dissolving the ethyl cellulose in a polymerizable solvent such as acrylic acid has a right-handed liquid crystalline structure, and surprisingly, the birefringence of this liquid crystalline solution is significantly high as compared to that of the liquid crystal formed with the ethyl cellulose with a degree of substitution of 2.5 (left-handed chiral nematic liquid crystal) and has a significantly improved selective reflectivity for right-circularly polarized light.

Further, the pitch of a chiral nematic liquid crystal can be controlled by varing the degree of substitution within the ranges mentioned above thereby to control the selective reflection wavelength. The higher the degree of substitution, the shorter the selective reflection wavelength will be.

A highly substituted ethyl cellulose employed in the present invention can be prepared by, for example, dissolving an alkyl cellulose with a degree of substitution of about 2.5 (e.g., ethyl cellulose), which is commercially available, in tetrahydrofuran and reacting with an alkyl iodide (e.g., ethyl iodide) in the presence of a catalyst such as sodium hydride.

Moreover, as for the ethyl acyl cellulose, a total degree of ethyl and acyl substitution adjusted to not less than 2.8 leads to the formation of a right-handed chiral nematic liquid crystal with improved birefringence and consequently the selective reflectivity is improved. Moreover, a higher acyl degree of substitution makes the pitch of a chiral nematic liquid crystal and consequently the selective reflection wavelength shorter, ensuring control of the selective reflection wavelength. Moreover, as the number of carbons of the acyl group increases, the pitch of a chiral nematic liquid crystal and selective reflection wavelength are lengthened.

An acyl ethyl cellulose with a high degree of substitution employed in the present invention can be obtained by acylating an unsubstituted hydroxyl group(s) of an ethyl cellulose on the market. For example, a highly substituted acyl ethyl cellulose is formed by dissolving a commercially available ethyl cellulose with an alkyl degree of substitution of 2.2 to 2.7 in pyridine and reacting with an acid anhydride or acid halide corresponding to the intended acyl group.

A theory for predicting the handedness and pitch of a chiral nematic liquid crystalline structure has not been found yet, but a right-handed chiral nematic liquid crystal shows excellent optical properties as compared to those of a left-handed one probably for the influence by the balance between the chiral repulsive force and the attractive force.

The weight average degree of polymerization of the cellulose derivative (e.g., ethyl cellulose) can be selected from the range of, in terms of polymethyl methacrylate, for example, about 50 to 1,500, preferably about 100 to 1,200, and more preferably about 150 to 1,000. Of the cellulose derivatives, when using a mixed solvent of toluene and ethanol of 8/2 ratio (volume ratio), the viscosity of a solution of a commercially available ethyl cellulose (degree of substitution: 2.5) at a concentration of 5% by weight and 25° C. is about 4 to 300 mPa·s (cps), preferably about 10 to 100 mPa·s (cps), and more preferably about 10 to 50 mPa·s (cps).

[Polymerizable solvent]

As the polymerizable solvent, there may be mentioned, for example, polymerizable monomers in liquid form and polymerizable monomers liquefied at room temperatures (about 10to 30° C.). The above polymerizable monomers include monomers having an ethylenically unsaturated bond such as a (meth)acryloyl group or a vinyl group (e.g., methacrylic monomers, vinyl monomers), and these monomers may be monofunctional, or difunctional or multifunctional compounds having a plurality of ethylenically unsaturated bonds. As the polymerizable monomer, a photopolymerizable monomer is usually employed.

As the polymerizable solvent, there may be mentioned, for example, (meth)acrylic acid, alkyl (meth)acrylates [e.g., $C_{1-10}$ alkyl (meth)acrylates such as methyl (meth)acrylate, ethyl (meth)acrylate, and butyl (meth)acrylate], hydroxyl group-containing (meth)acrylates [e.g., hydroxyethyl (meth) acrylate, 2-hydroxypropyl (meth)acrylate], glycidyl (meth) acrylate, dialkylaminoethyl (meth)acrylates [e.g., dimethylaminoethyl (meth)acrylate, diethylaminoethyl (meth) acrylate], (meth)acrylamide, N,N'-dimethyl(meth) acrylamide, heterocyclic ethylenically unsaturated compounds [e.g., N-vinyl heterocyclic compounds such as N-vinylpyrrolidone, N-vinylpyridine, and N-vinylimidazole], aromatic vinyls (e.g., styrene), vinyl ester-series monomers (e.g., vinyl acetate), vinyl ether-series monomers (e.g., methyl vinyl ether, ethyl vinyl ether), polymerizable carboxylic acids (e.g., maleic anhydride, crotonic acid, cinnamic acid), and esters thereof.

These polymerizable solvents can be used either singly or as a combination of two or more species. As the polymerizable solvent, (meth)acrylic acid or an ester thereof is usually employed.

The preferred polymerizable solvent includes at least (meth)acrylic acid which is both liquid crystal-formable and polymerizable. The content of the (meth)acrylic acid in the polymerizable solvent is usually about 50 mole % or more (e.g., 50 to 100 mole % and preferably 80 to 100 mole %).

Further, in the case where the water resistance is required for the selectively reflective shaped article of the present invention, the water resistance can be improved by adding a difunctional or multifunctional monomer thereby to form a three-dimentional structure. As the difunctional or multifunctional monomer, there may be mentioned, for example, polyalkylene glycol di(meth)acrylates [e.g., ethylene glycol di(meth)acrylate, diethylene glycol di(meth)acrylate, triethylene glycol di(meth)acrylate, polyethylene glycol di(meth) acrylate, propylene glycol di(meth)acrylate, polypropylene glycol di(meth)acrylate, 1,4-butanediol di(meth)acrylate, 1,6-hexanediol di(meth)acrylate, neopentyl glycol di(meth) acrylate, pentanediol di(meth)acrylate], trimethylolpropane tri(meth)acrylate, pentaerythritol tri(meth)acrylate, and petaerythritol tetra(meth)acrylate.

The content of the difunctional or multifunctional monomer is, in the polymerizable solvent, about 0.1 to 50% by weight (e.g., 0.1 to 30% by weight) and preferably about 1 to 20% by weight. The content exceeding 50% by weight leads to deterioration in liquid crystallinity and lowers the selective reflectivity.

[Concentration of Cellulose derivative]

The maximum selective reflection wavelength depends on the concentration of the cellulose derivative and can be shifted to the shorter wavelength side by raising the concentration. Therefore, according to the reflection wavelength, the cellulose derivative can be used in the form of a concentrated solution. The concentration of the cellulose derivative (cellulose derivative/polymerizable solvent) is usually about 0.7 to 1.5 g/mL, preferably about 0.8 to 1.3 g/mL, and more preferably about 0.9 to 1.2 g/mL. At a concentration of lower than 0.7 g/mL, the solution cannot form a chiral nematic liquid crystal. In the case where the concentration exceeds 1.5 g/mL, it takes time to obtain a uniform liquid crystalline solution. Incidentally, 1 mL of the polymerizable solvent is substantially equals to 1 g of a polymer formed therefrom.

Further, the pitch of the chiral nematic liquid crystalline solution is temperature dependent, and the maximum selective reflection wavelength can be shifted to the longer wavelength side by elevating the temperature. For example, when the chiral nematic liquid crystal solution shows the maximum selective reflection peak for a circularly polarized light in a wavelength region of 200 nm or longer and particularly in the visible region (e.g., wavelength of about 400 to 700 nm), the solution presents a beautiful color which corresponds to the reflection wavelength in the visible region. Further, the chiral nematic liquid crystal solution has an excellent birefringence. The birefringence of the chiral nematic liquid crystal solution comprising 1 g of the cellulose derivative relative to 1 mL of the polymerizable solvent is about 0.004 to 0.006, and preferably about 0.0045 to 0.0055.

The temperature of the solution for obtaining a shaped article of the present invention can be selected according to the species of the cellulose derivative or that of the polymerizable solvent, and is usually about −10° C. to 70° C., preferably about 0° C. to 50° C., and more preferably about 5° C. to 40° C.

[Additive]

(Polymerization initiator)

If necessary, the selectively reflective composition (liquid crystalline solution) comprising a cellulose derivative and a polymerizable solvent may further contain a polymerization initiator (particularly, a photopolymerization initiator). As the polymerization initiator, there may be mentioned, for example, benzoin-series photopolymerization initiators (e.g., benzoin $C_{1-4}$ alkyl ethers such as benzoin and benzoin methyl ether); benzophenone-series photopolymerization initiators (e.g., benzophenone, 3,3'-dimethyl-4-methoxybenzophenone, 4,4'-methoxybenzophenone); acetophenone or propiophenone-series photopolymerization initiators (e.g., acetophenone or derivatives thereof such as 2,2-dimethoxy-2-phenylacetophenone, acetophenone diethylketal, and diethoxyacetophenone, propiophenone or derivatives thereof such as 2-hydroxy-2-methyl-1-phenylpropan-1-one, 2-benzyl-2-dimethylamino-1-( 4-morpholinophenyl)-butanone, and 2-methyl-2-morpholino(4-thiomethylphenyl)propan-1-one, benzil and derivatives thereof such as benzil and benzil/dimethyl ketal); thioxanthone-series polymerization initiators (e.g., isopropylthioxanthone, 2,4-diethylthioxanthone, 2,4-dichlorothioxanthone); and other polymerization initiators (e.g., 1-hydroxycyclohexyl phenyl ketone, 3,6-bis(2-morpholinoisobutyl)-9-butylcarbazole).

These polymerization initiators can be used either singly or as a combination of two or more species.

The amount of the polymerization initiator used is, relative to 100 parts by weight of the polymerizable solvent, about 0.1 to 10 parts by weight (e.g., 0.3 to 8 parts by weight) and preferably about 0.5 to 5 parts by weight (e.g., 1 to 5 parts by weight).

(Polymerization accelerator or sensitizer)

If necessary, to the selectively reflective composition may be added a variety of polymerization promoters or sensitizers in order to accelerate the photopolymerization reaction by a photopolymerization initiator, for example, tertiary amines (e.g., N,N-dimethylaniline), dialkylaminobenzoic acids and derivatives thereof (e.g., 4-dimethylaminobenzoic acid, 4-dimethylaminobenzoic acid esters), and phosphine-series photopolymerization accelerators or promoters (e.g., phosphine-series compounds such as arylphosphines (e.g., triphenylphosphine) and alkylphosphines (e.g., trialkylphosphine). These polymerization accelerators or promoters can be used either singly or as a combination of two or more species. The amount of the polymerization accelerator to be added can be selected within the range of 0.01 to 10 parts by weight relative to 100 parts by weight of the polymerizable solvent.

(Other additives)

If necessary, the selectively reflective composition may contain other additives. As other additives, there may be exemplified stabilizers (e.g., antioxidants, ultraviolet ray absorbers, heat stabilizers), plasticizers, fillers, antistatic agents, and colorants (e.g., dyes).

These additives can be used either singly or as a combination of two or more species.

According to the present invention, a cellulose derivative forms a liquid crystalline phase in a polymerizable solvent, and the obtained liquid crystalline solution presents a beautiful color corresponding to the wavelength of a reflected light. Moreover, there can be obtained a liquid crystalline solution which has the reflection maximum in the range of wavelengths of 200 nm or longer and substantially reflects right-circularly polarized light selectively by controlling or adjusting the degree of substitution of the cellulose derivative, or the concentration of the polymerizable solvent and temperature. Further, the liquid crystalline solution can be solidified by polymerizing the polymerizable solvent while maintaining the above-described liquid crystal structure and optical properties. The obtained solidified product has the same optical properties as those of the solution. Therefore, the present invention is useful also for producing shaped articles having selective reflectivity.

[Selectively reflective shaped article and process for producing the same]

According to the present invention, the above-described liquid crystalline solution can be solidified by polymerization while maintaining the liquid crystalline structure of the solution. For this purpose, it is desirable that the liquid crystalline solution is solidified by a polymerization method which does not distort the liquid crystalline structure of the solution, particularly by photopolymerization.

In other words, the cellulose derivative is dissolved in the polymerizable solvent to prepare a uniform liquid crystalline solution, and the solution is held in a certain shape and irradiated with active light such as ultraviolet ray.

The shape of the obtained shaped article is not particularly limited. It may have a three-dimensional structure and usually has a two-dimensional structure as represented by a thin film or membrane (particularly, films, sheets).

A shaped article having a two-dimensional structure can be produced by interposing a liquid crystalline solution between substrates and polymerizing by irradiation with ultraviolet ray or the like for fixation. The species of the substrate (base) is not specifically limited and a suitable support or base with an appropriate surface such as a plane or curved surface (particularly, flat or smooth surface) can be used depending on its intended use. Examples of its material are plastics, ceramics (e.g., glass), and metals.

Incidentally, a selectively reflective film or sheet is obtained by delaminating (or peeling) the cured (or set) selectively reflective shaped article off the base or substrate.

A shaped article having a three-dimensional structure can be formed by injecting or feeding a liquid crystalline solution into a light-transmittable container or vessel (of glass, plastic, or other material) or filling the container or vessel up with the solution, and polymerizing the solution after being allowed to form a liquid crystalline phase by irradiation with light thereby to solidify.

Moreover, the surface of a molded article of a certain shape may be coated with the above-described selectively reflective composition to form a liquid crystalline phase thereon, followed by the polymerization of the liquid crystalline phase by irradiation with light thereby to fix the liquid crystalline phase. In the present invention, the whole body of a shaped article may be formed with the aforementioned cellulose derivative-containing composition, or the shaped article may be provided with a selectively reflective layer comprising the above cellulose derivative at least on the surface thereof. Such shaped articles can be obtained without a step of delaminating the cured coated film.

Further, the liquid crystalline solution is coated on the base or substrate by a conventional method, e.g., roll coating, reverse coating, gravure coating, spray coating, dipping, spin coating, etc. Photopolymerization after the coating gives a uniform thin film (thin film-like shaped article) of the liquid crystalline solution.

The thickness of the film or selectively reflective layer may be, e.g., about 5 to 1,000 $\mu$m, preferably about 5 to 200 $\mu$m, more preferably about 5 to 100 $\mu$m, and usually about 5 to 70 $\mu$m.

As the light source for exposure, there may be exemplified active lights such as radioactive rays (e.g., ultraviolet ray, electron beam, X-ray).

The shaped article of the present invention (particularly, thin film-like shaped article) is useful in various fields where selective reflectivity and circular polarization are utilized, e.g., as a part of a circularly polarized light generator (particularly, an element which constitutes an optical system) or a material for decoration (e.g., decorative films).

According to the present invention, since a specific cellulose derivative and a polymerizable solvent are used in combination, a shaped article which shows excellent selective reflectivity with respect to wavelength and right-circularly polarized light can be obtained at relatively low cost, and there is no need for using harmful substances to the environment. Further, the liquid crystalline structure and optical properties of the obtained shaped article are the same as those of the liquid crystalline solution before being formed into an article, and the article is excellent in selective reflectivity and can be used as a main component or a decoration material of a circularly polarized light generating device.

EXAMPLE

Hereinafter, the present invention will be further described in detail with reference to the examples and should by no means be construed as defining the scope of the invention.

The birefringence of a liquid crystalline solution was evaluated with an Abbe refractometer by, at room temperature (23° C.), applying a linear polarizer to the eye piece. The maximum selective reflection wavelength and the reflection intensity at the maximum selective reflection wavelength were measured at room temperature for a sample of 300 $\mu$m thick using a ultraviolet-visible spectrophotometer. The handedness of circularly polarized light selectively reflected was visually examined using a circular polarization filter consisting of a linear polarizing plate and a ¼ wavelength phase-difference plate.

Example 1

A commercially available ethyl cellulose in an amount of 20g [Aldrich Chemical Company, Inc., the degree of substitution: 2.5, the viscosity of a solution containing 5% by weight of ethyl cellulose in toluene/ethanol (8/2): 10 mPa·s (cps)] was dissolved in 100 ml of pyridine. To the solution was added 100 ml of acetic anhydride and acetylation was effected at 100° C. over 5 hours to give an acetylated ethyl cellulose having an ethyl degree of substitution of 2.5 and an acetyl degree of substitution of 0.5. The weight, average molecular weight of the obtained acetylated ethyl cellulose was 110,000 in terms of polymethyl methacrylate.

The acetylated ethyl cellulose was dissolved in acrylic acid at various concentrations to prepare chiral nematic liquid crystalline solutions. The obtained liquid crystalline solutions were evaluated for their birefringence, maximum selective reflection wavelength, reflection intensity at the maximum selective reflection wavelength, the handedness of circularly polarized light selectively reflected, and color.

Comparative Example 1

A commercially available ethyl cellulose [Aldrich Chemical Company, Inc., the degree of substitution: 2.5, the viscosity of a solution containing 5% by weight of ethyl cellulose in toluene/ethanol (8/2): 10 mPa·s (cps)] was dissolved in acrylic acid at various concentrations to prepare chiral nematic liquid crystalline solutions. The obtained liquid crystalline solutions were evaluated for their birefringence, maximum selective reflection wavelength, reflection intensity at the maximum selective reflection wavelength, the handedness of circularly polarized light selectively reflected, and color.

The results are shown in Table 1.

TABLE 1

|  | Concentration (Polymer g/ Solvent ml) | Birefringence | Reflection wavelength (nm) | Reflection intensity (%) | Handedness* | color |
|---|---|---|---|---|---|---|
| Ex. 1 | 1.00 | 0.0049 | 706 | 38 | right | red |
|  | 1.10 | 0.0050 | 609 | 45 | right | red |
|  | 1.20 | 0.0055 | 536 | 50 | right | green |
|  | 1.30 | 0.0055 | 495 | 50 | right | blue |
| Comp. | 0.85 | 0.0009 | 578 | 20 | left | orange |
| Ex. | 0.90 | 0.0022 | 534 | 28 | left | green |
|  | 0.95 | 0.0027 | 490 | 35 | left | blue |
|  | 1.00 | 0.0031 | 458 | 40 | left | bluish purple |

*the handedness of circularly polarized light selectively reflected

Example 2

To the liquid crystalline solution obtained in Example 1 was added 2% by weight of benzophenone and 0.5% by weight of N,N-dimethylaniline relative to acrylic acid, and the mixture was stirred well to give a uniform solution. The solution was then interposed between the glass plates, the thickness of solution interposed therebetween being 300 µm. Using a high-pressure mercury lamp of 200 mW, the thin film of this liquid crystalline solution was irradiated with ultraviolet ray over 30 minutes. The sample after the irradiation with ultraviolet ray showed no fluidity but had the same external appearance (color) as the sample had possessed before the irradiation. The maximum selective reflection wavelength, reflection intensity, the handedness of circularly polarized light selectively reflected by the sample after the irradiation were the same as those before the irradiation.

Comparative Example 2

To the liquid crystalline solution obtained in Comparative Example 1 was added 2% by weight of benzophenone and 0.5% by weight of N,N-dimethylaniline relative to acrylic acid, and the mixture was stirred well to give a uniform solution. The solution was then interposed between the glass plates, the thickness of solution interposed therebetween being 300 µm. Using a high-pressure mercury lamp of 200 mW, the thin film of this liquid crystalline solution was irradiated with ultraviolet ray over 30 minutes. The sample after the irradiation with ultraviolet ray showed no fluidity but had the same external appearance (color) as the sample had possessed before the irradiation. The maximum selective reflection wavelength, reflection intensity, the handedness of circularly polarized light selectively reflected by the sample after the irradiation were the same as those before the irradiation.

What is claimed is:

1. A selectively reflective shaped article comprising a cellulose derivative an alkyl degree of substitution of 2.2 to 3, an acyl degree of substitution of 0.1 to 0.8, and a total degree of alkyl and acyl substitution of 2.8 to 3, and a polymer of a polymerizable solvent, which selectively reflects right-circularly polarized light.

2. A selectively reflective shaped article according to claim 1, wherein the alkyl group of the cellulose derivative is a $C_{1-6}$ alkyl group.

3. A selectively reflective shaped article according to claim 2, wherein the alkyl group of the cellulose derivative is an ethyl group.

4. A selectively reflective shaped article according to claim 1, wherein the acyl group of the cellulose derivative is a $C_{2-4}$ acyl group.

5. A selectively reflective shaped article according to claim 4, wherein the acyl group of the cellulose derivative is an acetyl group.

6. A selectively reflective shaped article according to claim 1, wherein the cellulose derivative comprises acetyl ethyl cellulose having an ethyl degree of substitution of 2.5 to 2.9 and an acetyl degree of substitution of 0.1 to 0.5.

7. A selectively reflective shaped article according to claim 1, wherein the weight average degree of polymerization is 50 to 1,500 in terms of poly(methyl methacrylate).

8. A selectively reflective shaped article according to claim 1, wherein the cellulose derivative forms a chiral nematic liquid crystal structure.

9. A selectively reflective shaped article according to claim 1, wherein the polymerizable solvent is at least one member selected from the group consisting of (meth)acrylic acid and an ester thereof.

10. A selectively reflective shaped article according to claim 9, wherein the polymerizabe solvent is (meth)acrylic acid.

11. A selectively reflective shaped article according to claim 1, wherein the content of (meth)acrylic acid in the polymerizable solvent is 50 to 100 mole %.

12. A selectively reflective shaped article according to claim 1, wherein the proportion of the cellulose derivative is 0.7 to 1.5 g relative to 1 g of the polymer of the polymerizable solvent.

13. A selectively reflective shaped article according to claim 1, wherein the birefringence of the shaped article comprising 1 g of the cellulose derivative relative to 1 g of the polymer of the polymerizable solvent is 0.004 to 0.006.

14. A selectively reflective shaped article according to claim 1, which is in the form of a film or sheet.

15. A selectively reflective composition which comprises a cellulose derivative having an alkyl degree of substitution of 2.2 to 3, an acyl degree of substitution of 0.1 to 0.8, and a total degree of alkyl and acyl substitution of 2.8 to 3, and a polymerizable solvent.

16. A process for producing a selectively reflective shaped article, which comprises the step of polymerizing a solution having a liquid crystalline structure and containing
  (i) a cellulose derivative having an alkyl degree of substitution of 2.2 to 3, an acyl degree of substitution of 0.1 to 0.8, and a total degree of alkyl and acyl substitution of 2.8 to 3 and
  (ii) a polymerizable solvent while maintaining the liquid crystalline structure of the solution.

17. A process for producing a selectively reflective shaped article according to claim 16, wherein the solution is photopolymerized.

* * * * *